United States Patent [19]

Mirr, deceased et al.

[11] 4,134,942

[45] Jan. 16, 1979

[54] METHOD FOR PRODUCING FOAMED ARTICLES

[75] Inventors: Gordon J. Mirr, deceased, late of Zion, Ill., by Marie Mirr, executrix; Ivan Lestan, Winthrop Harbor, Ill.; Myron T. Stevens, Kenosha, Wis.

[73] Assignee: Outboard Marine Corporation, Waukegan, Ill.

[21] Appl. No.: 824,517

[22] Filed: Aug. 15, 1977

Related U.S. Application Data

[62] Division of Ser. No. 644,097, Dec. 24, 1975, abandoned.

[51] Int. Cl.² ............................................. B29D 27/04
[52] U.S. Cl. .................................. 264/26; 264/46.6; 264/46.8; 264/51
[58] Field of Search ................. 264/46.8, 26, 92, 46.6, 264/51

[56] References Cited

U.S. PATENT DOCUMENTS

| | | | |
|---|---|---|---|
| 2,341,617 | 2/1944 | Hull | 264/26 |
| 2,441,548 | 5/1948 | Sperry | 264/26 |
| 2,604,665 | 7/1952 | Bosomworth et al. | 264/26 |
| 3,091,946 | 6/1963 | Kesling | 264/92 X |
| 3,187,069 | 6/1965 | Pincus et al. | 264/46.8 |
| 3,217,362 | 11/1965 | Jacobs | 264/26 X |
| 3,258,511 | 6/1966 | McGregor | 264/46.8 X |
| 3,294,879 | 12/1966 | Jacobs | 264/26 |
| 3,420,923 | 1/1969 | Ashworth et al. | 264/46.6 X |
| 3,475,522 | 10/1969 | Garibian et al. | 264/26 |

FOREIGN PATENT DOCUMENTS

1098312  1/1968  United Kingdom .................... 264/46.8

OTHER PUBLICATIONS

Lanigan, W. J. "Microwave Curing of Flexible Polyurethane Foam Mouldings," in *British Plastics*, Oct. 1963, pp. 562–565.

*Primary Examiner*—Philip Anderson
*Attorney, Agent, or Firm*—Michael, Best & Friedrich

[57] ABSTRACT

Disclosed herein is a method for producing foamed articles, such as seat cushions for a riding lawn mower or the like, which method includes the steps of providing a mold having at least two separable, electrically insulated mold sections, which, when positioned together in a molding position, cooperate to define a molding chamber having the shape of the article, providing each mold section with a separate radio frequency electrode, introducing a foamable and heat curable material into the mold cavity, and applying a radio frequency voltage across the electrodes, and thus through the foamable and heat curable material, after the mold sections are positioned together in a molding position. The resultant internal heating of the material rapidly cures the material to a hardened condition and without generating high internal pressure forces inside the molding chamber.

In one embodiment, a skin-forming material, such as a sheet or film of a flexible thermoplastic resin, is laid over the mold cavity of one of the mold sections and is vacuum formed into conformity with the contour of the molding section surface and a foamable and heat curable pad-forming material is introduced into the molding chamber on top of the skin-forming material prior to the application of the radio frequency voltage.

11 Claims, 5 Drawing Figures

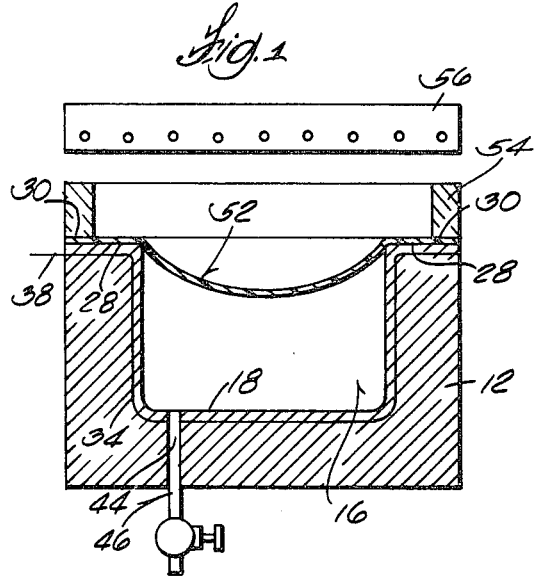
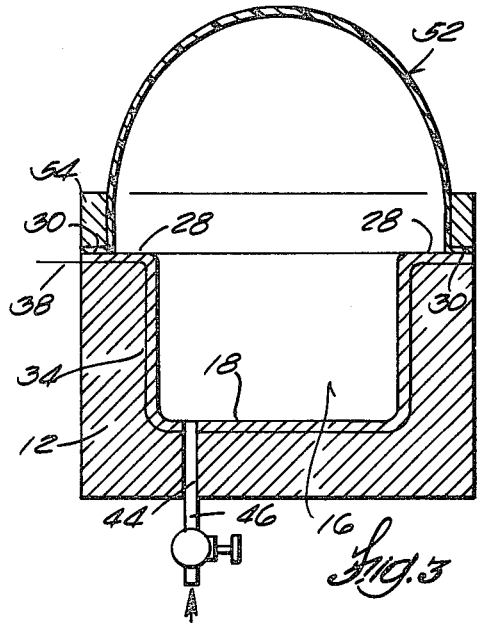
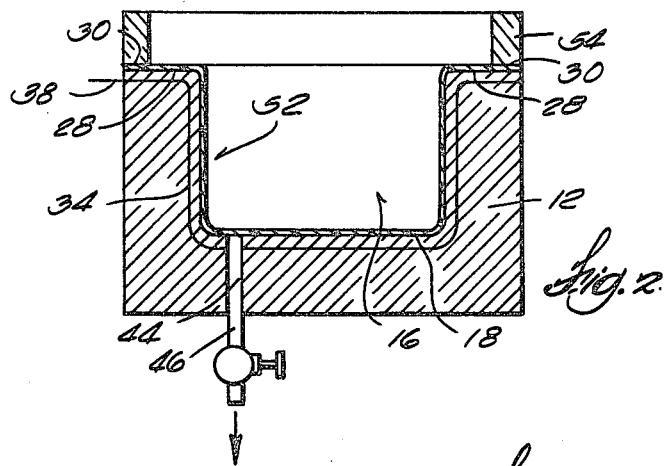
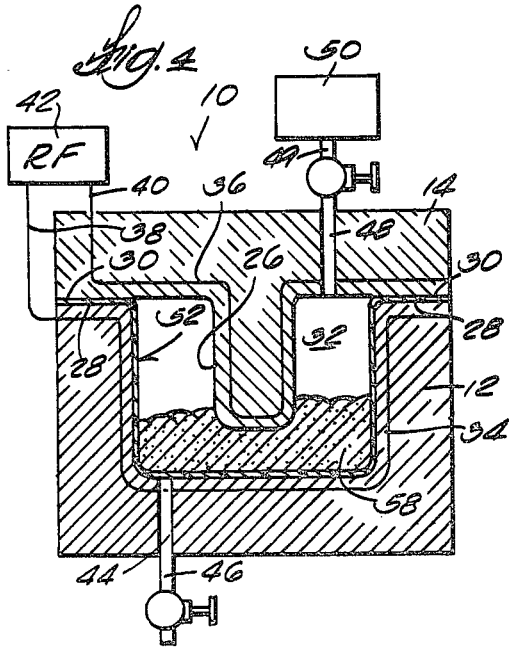
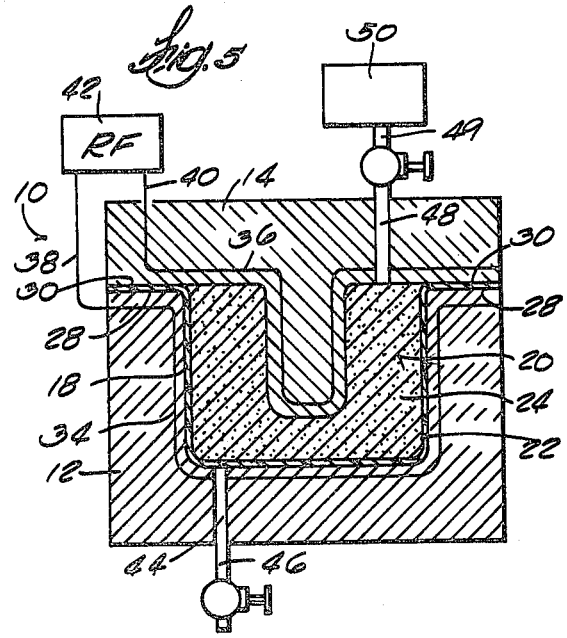

METHOD FOR PRODUCING FOAMED ARTICLES

CROSS REFERENCE TO RELATED APPLICATIONS

This application is a divisional of application Ser. No. 644,097, filed Dec. 24, 1975, now abandoned.

BACKGROUND OF THE INVENTION

This invention relates to methods for producing foamed articles, such as seat cushions for riding lawn mowers and the like.

In one typical method for producing foamed pad seat cushions having an outer skin or coating, the skin forming material is first formed into the desired shaped on a male mandrel, placed in the molding chamber of a foaming mold, and then a foamable material for forming the pad is in introduced into the molding chamber, on top of the preformed skin, wherein it expands to the desired shape and cures to a hardened or semi-hardened condition. This method requires several manual steps and a cure time of several hours, even days in some cases. Also, because of the high pressures generated during foaming, the mold usually must be constructed from relatively high strength and expensive materials. In order to reduce fabrication costs, a method capable of rapidly curing the foamed material and requiring less expensive mold constructions is highly desirable.

SUMMARY OF THE INVENTION

The invention provides a method for forming an article from a foamable material including the steps of providing a mold having at least two separable, electrically insulated mold sections, at least one of the mold sections having a mold cavity and each mold section having a molding surface which, when the mold sections are placed together in a molding position, cooperate to define a molding chamber which includes the mold cavity and which has the shape of the article and also having a separate radio frequency electrode, introducing a foamable and heat curable material into the mold cavity, either immediately prior to positioning the mold sections together in a molding position or after the mold sections have been positioned together, and applying a radio frequency voltage between the electrodes and thus through the material thereby causing internal heating of the material to rapidly cure it to a hardened condition after it has expanded to fill the molding chamber and without generating high internal pressure forces inside the molding chamber.

The invention further provides a method for forming a skin-covered, foam-padded article including the steps of providing a mold including first and second separable, electrically insulated mold sections, at least one of the mold sections having a mold cavity and each mold section having a molding surface which, when the mold sections are positioned together in a molding position, cooperate to define a molding chamber which includes the mold cavity and which has the shape of the article and also having a separate radio frequency electrode, separating the mold sections, positioning a sheet or film of flexible skin-forming material on the first mold section with the outer margin of the skin-forming material extending beyond the margin of the molding surface, clamping the outer margin of the skin-forming material in a fixed position on the first mold section, applying a vacuum to the first mold section to vacuum form the skin-forming material in tight conformity with the contour of the molding surface of the first mold section, introducing a foamable and heat curable, pad-forming material into the mold cavity, either immediately prior to positioning the mold sections together in a molding position or after the mold sections positioned together in a molding position, and applying a radio frequency voltage between the electrodes, and thus through the pad-forming material, thereby causing internal heating of the pad-forming material so as to rapidly cure the pad-forming material after it has expanded to fill the molding chamber.

One of the principal features of the invention is the provision of a method for forming formed articles whereby the articles can be formed and the foam cured with an inexpensively constructed mold and at high production rates.

Another of the principal features of the invention is the provision of a simplified method for forming skin-covered, foam-padded articles, such as seat cushions.

Other features, aspects and advantages of the invention will become apparent upon reviewing the following detailed description, the drawing and the appended claims.

BRIEF DESCRIPTION OF THE DRAWING

FIG. 1 is a schematic representation of a female mold section of a molding apparatus incorporating various of the features of the invention and adaptable for forming a skin-covered, foam-padded seat cushion, showing a sheet of skin-forming material in position ready for the vacuum forming step.

FIG. 2 is a schematic similar to FIG. 1 showing the position of the skin-forming material after the vacuum forming step.

FIG. 3 is a schematic similar to FIG. 1 illustrating an optional stretching step of the skin-forming material prior to the vacuum forming step.

FIG. 4 is a schematic representation of the entire molding apparatus incorporating various of the features of the invention showing the mold sections in the molding position and the pad-forming material prior to expansion or foaming.

FIG. 5 is a schematic similar to FIG. 4 showing the pad-forming material fully expanded or foamed.

Before explaining the invention in detail, it is to be understood that the invention is not limited in its application to the details of operation or construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

The drawing is a schematic representation of a molding apparatus adapted to mold a skin-covered, foam-padded seat cushion for a riding lawn mower or the like. Referring to FIG. 5, the molding apparatus 10 includes two separate mold sections, preferably constructed from an electrically non-conductive material, a first or female mold section 12 and a second or male mold section 14.

The female mold section 12 is provided with a mold cavity 16 (FIG. 1) including a molding surface 18 having a shape corresponding to the contour of the exterior surface of the seat cushion 20 (FIG. 5) which has an outer coating or skin 52 and a foamed pad 24 bonded to the skin 52. The male mold section 14 is provided with a molding surface 26 (FIG. 4) having a shape corresponding to the contour of the interior surface of the pad 24. Each of the mold sections 12 and 14 have complementary mating surfaces 28 and 30 which extend outwardly beyond margins of the corresponding molding surfaces 18 and 26. In the specific construction illustrated, the mating surfaces 28 and 30 are flat and extend horizontally from the margin of the corresponding molding surfaces 18 and 26; however, they may have other complementary configurations. When the mold sections 12 and 14 are positioned together in the molding position shown in FIGS. 4 and 5, the molding surfaces 18 and 26 cooperate to define a molding chamber 32 having a shape corresponding to the shape of the seat cushion 20.

The mold sections 12 and 14 are respectively provided with electrodes 34 and 36 which are located at or closely spaced from the respective molding surfaces 18 and 26. The electrodes 34 and 36 are arranged to serve as antenna for radio frequency waves and are electrically insulated from each other to prevent shorting. In the specific construction illustrated, the mold sections 12 and 14 are formed from an organic resinous material, such as an epoxy, and the electrodes 34 and 36 are in the form of a plate or layer of metallic material embedded in the respective mold section relatively close to the respective molding surfaces 18 and 26. When the mold sections 12 and 14 are positioned together in the molding position as shown in FIGS. 4 and 5, the electrodes 34 and 36 are electrically insulated from each other and preferably are located in parallel relationship. Electrically connected to each of the electrodes 34 and 36 and extending outwardly from the respective mold sections 12 and 14 are a pair of electrical leads or terminals 38 and 40 which are spaced from each other to prevent shorting and are adapted for connection to a conventional radio frequency (RF) generator 42. One of the terminals 38 and 40 is connected to the positive terminal of the RF generator and the other is connected to the negative terminal of the RF generator.

While an exemplary construction of the mold sections 12 and 14 is illustrated, it should be understood that the mold sections can be constructed from a variety of materials using various suitable fabrication techniques so long as the electrodes 34 and 36 and the terminals 38 and 40 are electrically insulated from each other. For instance, each mold section can be constructed in the following manner: a model or pattern of the article to be made is formed from wood, clay, plastic or the like, a layer of electrically conductive material capable of serving as an electrode, such as ⅛ inch layer of zinc and aluminum, is sprayed or otherwise suitably applied onto one of the exterior surfaces of the pattern in a manner to be releasable therefrom, the layer of electrically conductive material is reinforced by coating with a layer of an epoxy material, and the thus-formed section of the mold core, after attachment of a suitable terminal, is placed in a wooden box-like frame filled with a high temperature epoxy material with the terminal extending externally of the frame to facilitate connection to the RF generator. The other mold section is constructed in the same manner except a layer of electrically conductive material is applied to the opposite exterior surface of the pattern. With this arrangement, the layer of electrically conductive material in each of the resulting mold sections serves both as the entire or a portion of a molding surface and an electrode and the epoxy filling, after curing, provides a rigid support therefor. The layers of electrically conductive material and the terminals connected thereto must be electrically insulated from each other in order to prevent shorting.

The female mold section 12 can be provided with one or more passageways or ports 44 (one shown) communicating with the mold cavity 16. Connected in communication with the port 44 is a conduit 46 which in turn is connected to a suction or vacuum pump (not shown) and may also be connected, through a suitable conduit arrangement, to a source of pressurized fluid (not shown) for purposes explained below. As shown in FIGS. 4 and 5, the male mold section 14 can be provided with a passageway or port 48 communicating with the molding chamber 32 through which a foamable and heat curable pad-forming material can be introduced into the molding chamber 32. For this purpose, a conduit 49, can be connected in communication with the port 48 and to a supply tank 50 containing the pad-forming material.

One embodiment of the method of the invention for making a skin-covered, foamed pad seat cushion will now be described in detail. With the mold sections 12 and 14 separated, a sheet or film of a flexible skin-forming material 52 is laid over the cavity 16 of the female mold section 12 with the central portion draped down into the mold cavity 16 as shown in FIG. 1. The skin-forming material 52 may be any conventional relatively flexible or resilient material, including fabrics, commonly used for this purpose. Thermoplastic resinous materials which are compatible with the pad-forming material, i.e., insoluble in the pad-forming material, are preferred. Representative examples include vinyl chloride polymers, vinylidene chloride polymers, homo- and copolymers of ethylene and propylene, acrylate homo- and copolymers, etc., with or without some type of reinforcing material incorporated therein. Nylonreinforced polyvinylchloride is particularly adaptable as the skin-forming material.

The outer margin of the skin-forming material 52 is clamped into a substantially gas-tight engagement with the mating surface 28 of the female mold section 12 with a clamping or hold-down frame 54. When a thermoplastic resinous material is used, the skin-forming material 52 preferably is heated to a softened condition, such as with an overhead heater 56 as shown in FIG. 1, to facilitate its deformation into conformity with the contour of the molding surface 18 of the female mold section 12. While the skin-forming material 52 is still in a softened condition, suction is applied to the conduit 46 to exhaust air from the mold cavity 16, thereby creating a pressure differential between the upper and lower faces of the material and causing the material to be vacuum formed or distended into tight conformity with the contour of the molding surface 18 of the female mold section as shown in FIG. 2. For some skin-forming materials, the vacuum forming step can be performed with the material at room temperature.

FIG. 3 illustrates an optional pre-stretching step whereby a pressurized fluid, such as air, is introduced into the mold cavity 16 through the conduit 46, prior to the vacuum forming step, while the skin-forming material is either in a softened condition or at room temperature. This produces a uniform stretching of the unrematerial 52 can be trimmed or turned over and secured to the underside of the pad 24, such as with a suitable adhesive.

While the production of a skin-covered, foamed article has been described in detail, it is within the scope of the invention to produce foamed articles which do not include an outer skin. In that case, the foamable material 58 is introduced directly into the cavity 16 of the female mold section 12, either before or after the male mold section 14 has been moved into the molding position, and the RF generator 42 is energized. For this type of operation, the female mold section 12 either is not provided with the port 44 or the port is suitably plugged to prevent extrusion of the foamable material thereinto during expansion.

Also, it is within the scope of the invention to provide a foamed article with an outer skin or coating on both surfaces. This can be accomplished by providing the male mold section 14 with one or more ports like the port 44 in the female mold section 12 and vacuum forming a skin-forming material into conformity with the contour of the male section molding surface 26 as described above. The pad-forming material preferably is introduced into the cavity 16 of the female mold section 12 on top of the skin-forming material located therein prior to placing the mold sections together in the molding position.

Various of the features of the invention are set forth in the following claims.

What is claimed is:

1. A method for manufacturing an article from a foamable material including the steps of providing a mold having at least two separable, closeable mold selections made from an electrically insulative material, at least one of the mold sections having a mold cavity and each mold section having a molding surface which, when the mold sections are closed together in a molding position, cooperate to define a molding chamber including the mold cavity and having the shape of the article providing a thin layer of an electrically conductive material on each of the mold sections, which layer forms at least a portion of the molding surface of the respective mold section and is adapted to serve as a radio frequency electrode, introducing a foamable and heat curable material into the mold cavity, and applying a radio frequency voltage across the electrodes, and thus through the foamable and heat curable material, after the mold sections are closed together in the molding position, thereby causing internal heating of the material so as to rapidly cure the material to a hardened condition after it has expanded to fill the molding chamber and without generating high internal pressure forces inside the molding chamber.

2. A method according to claim 1 wherein the foamable and heat curable material is introduced into the mold cavity prior to closing the mold sections together in the molding position.

3. A method according to claim 1 wherein the foamable and heat curable material is introduced into the mold cavity after the mold sections have been closed together in the molding position.

4. A method for forming a skin-covered, foampadded article comprising the steps of providing a mold having first and second separable, closeable mold sections made from an electrically insulative material, at least one of the mold sections having a mold cavity and each mold section having a molding surface which, when the mold sections are closed together in a molding position, cooperate to define a molding chamber including the mold cavity and having the shape of the article providing a thin layer of an electrically conductive material on each of the mold sections, which layer forms at least a portion of the molding surface of the respective mold section and is adapted to serve as a radio frequency electrode, separating the mold sections, positioning a sheet of flexible skin-forming material on the first mold section with the outer margin of the skin-forming material extending beyond the margin of the molding surface thereof, clamping the outer margin of the skin-forming material in a fixed position on the first mold section, applying a vacuum to the first mold section to vacuum form the skin-forming material into tight conformity with the contour of the molding surface of the first mold section, introducing a foamable and heat curable, pad-forming material into the mold cavity, and applying a radio frequency voltage across the electrodes, and thus through the padforming material, after the mold sections are closed together in the molding position, thereby causing internal heating of the pad-forming material so as to rapidly cure it to a hardened condition after it has expanded to fill the molding chamber.

5. A method according to claim 4 wherein the pad-forming material is introduced into the mold cavity prior to closng the mold sections together in the molding position.

6. A method according to claim 4 wherein the pad-forming material is introduced into the mold cavity after the mold sections have been closed together in the molding position.

7. A method according to claim 6 wherein the foamable composition is in liquid form.

8. A method according to claim 4 including the step of applying a fluid pressure to the first mold section, prior to said vacuum forming step, so as to uniformly stretch the unrestrained portion of the skin-forming material.

9. A method according to claim 4 wherein the pad-forming material is a foamable composition which forms a polyurethane foam.

10. A method according to claim 4 wherein the skin-forming material is a thermoplastic resinous material and including the step of heating the skin-forming material to a softened condition prior to said vacuum forming step.

11. A method according to claim 4 including the step of applying a fluid pressure to the first mold section, prior to said vacuum forming step and while the skin-forming material is in a softened condition, so as to uniformly stretch the unrestrained portions of the skin-forming material.

* * * * * strained portion of the skin-forming material 52 as shown in FIG. 3, thereby insuring that a more uniform final thickness of the skin 52 is obtained during the vacuum forming step. For articles where the mold cavity 16 is relatively shallow, a uniform stretching of the skin-forming material 52 can be obtained during the vacuum forming step without pre-stretching. Therefore, this optional pre-stretching step is preferred only for articles having configurations requiring the mold cavity 16 to be relatively deep.

After this vacuum forming step, the hold-down frame 54 is removed and the male mold section 14 is moved into the molding position, as shown in FIG. 4, with the outer margin of the skin-forming material 52 sandwiched or clamped between the mating surfaces 28 and 30 of the mold sections 12 and 14. The vacuum can be released prior to removal of the hold-down frame 54 or left on throughout the subsequent molding and curing operations if desired. A quantity of a foamable and heat curable pad-forming material 58 is introduced into the molding chamber 32 from the supply tank 50 via the conduit 49 and the port 48. If desired, the pad-forming material 58 can be introduced into the mold cavity 16 of the female mold section 12 immediately prior to moving the male mold section 14 into the molding position, in which case the port 48 can be omitted from the male mold section 14.

The specific formulation of the pad-forming material 58 does not form a part of the invention. Generally, any foam-forming and heat curable thermosetting or thermoplastic material known in the art as being suitable for forming a resilient pad can be used. These foam-forming compositions typically are comprised of a predominate proportion of a resinous and/or an elastomeric material and a small proportion of a blowing or foaming agent and can include other ingredients such as a catalyst and a cross-linking agent. Representative examples of acceptable foamable compositions include thermosetting resins, such as phenolaldehyde, urea-aldehyde and melamine-aldehyde compositions, and thermoplastic resins, such as cellulose ethers and esters and homopolymers and interpolymers derived from monomers containing the vinylidene group. A conventional "oneshot" or "pre-polymer" method may be used in forming the foamed pad.

Particularly advantageous pad-forming compositions are liquid foamable polyester urethane or polyether urethane compositions which are made by reacting an isocyanate with hydroxyl-terminated polyesters or polyethers. A typical foamable composition may include water, an alkylene oxide derivative having an average molecular weight of 1,500 to 5,000, such as Freeman Chemical 1944, an amine catalyst, such as N,N' — dimethyl piperazine, 1,2,4 trimethyl piperazine, tetramethyl guanidine and mixtures thereof, an isocyanate, such as toluene 2,4-diisocyanate, and a blowing or foaming agent, such as trichloromonofluoromethane.

In the specific method illustrated, the ingredients making up the foamable system are mixed in their proper proportions in the supply tank 50 and immediately introduced into the molding chamber 32 at substantially ambient pressure.

A sufficient amount of the pad-forming material 58 is added to the molding chamber 32 so that the resultant expanded foam completely fills the chamber. After the pad-forming material 58 is introduced into the molding cavity 32, the RF generator 42 is energized to establish a high voltage radio frequency field between electrodes 34 and 36 and thus through the pad-forming material. The alternating high frequency voltage passing through the pad-forming material causes an agitation of the molecules, generating internal heat which accelerates the foaming reaction and rapidly cures the pad-forming material 58 into a hardened condition to form the pad 20. During the foaming and curing operation, the skin 52 is bonded or laminated to the pad 24. Thus, the molding apparatus 10, in addition to functioning as a mold for forming the seat cushion 20 into the desired shape, also functions much like a microwave oven for rapidly curing the foamed pad 24.

The RF generator 42 can be energized substantially simultaneously with the introduction of the pad-forming material 58 into the molding chamber 32. However, in order to obtain a closer control of the density of the resultant foamed pad 20, it is preferred to delay energization of the RF generator 42 until the pad-forming material 58 has expanded to a point where it substantially fills the molding chamber 32. The high frequency electrical energy provided by the RF generator 42 effects a rapid curing of the foamed material within a matter of a few seconds, e.g., less than 30 seconds. It has been found that this rapid curing prevents a build up of high internal pressures in the molding chamber 32, thereby permitting the mold sections 12 and 14 to be constructed from relatively inexpensive, low strength materials. Apparently, the curing provided by the RF electric energy is rapid enough to cause a setup or hardening of the base component of the pad-forming material before an excessive amount of gas is generated, thereby eliminating the normal high internal pressure forces which tend to separate the mold sections.

The RF generator 42 preferably is energized for a period of time sufficient to obtain substantially complete curing of the pad-forming material 58. For a given voltage and frequency applied to the electrodes 34 and 36 by the RF generator 42, the heat developed in the pad-forming material 58 will vary depending primarily upon the dielectric constant and the loss angle of the material. The dielectric constant of the material varies with the degree of curing. Thus, the length of the heating cycle for a particular pad-forming material may be determined by measuring the dielectric constant through the material during heating and de-energizing the RF generator 42 when the dielectric constant reaches a predetermined level indicative of complete curing or substantially completely curing. The rate of heating provided by the RF generator 42 may be controlled by varying either the level or frequency of the RF voltage applied to the electrodes 34 and 36. As a guide, when a 10KW RF generator is used, when the thickness of the foamed pad is about 6 inches, when the pad-forming material is a liquid foamable polyurethane composition, and when the electrodes are spaced closely adjacent the molding surfaces, complete curing can be obtained within about 10–20 seconds with 1 amp current.

While the electrodes 34 and 36 are illustrated as parallel plates, they can have other configurations which permit a variation in the distribution of the RF electrical field through the pad-forming material 58 and thereby vary the degree of curing for various parts of the article as desired.

When the curing operation is completed, the vacuum is released (if not done previously), the male mold section 14 separated from the female mold section 12, the molded seat cushion 20 removed from the female mold section 12, and the marginal edges of the skin-forming